United States Patent [19]
Van Der Est

[11] Patent Number: 5,556,535
[45] Date of Patent: Sep. 17, 1996

[54] FILTRATION SYSTEM FOR RECYCLING WATER USED IN A CAR WASH

[75] Inventor: N. Van Der Est, Ambacht, Netherlands

[73] Assignee: Micro Tec B.V., Oostzaan, Netherlands

[21] Appl. No.: 331,386

[22] Filed: Oct. 28, 1994

[30] Foreign Application Priority Data

Nov. 5, 1993 [NL] Netherlands ............................ 9301927

[51] Int. Cl.⁶ ...................................................... B01D 36/00
[52] U.S. Cl. ........................... 210/140; 210/139; 210/167;
210/195.1; 210/196; 210/206; 210/209;
210/252; 210/258; 210/259; 210/332; 210/333.01;
210/411; 138/40
[58] Field of Search ........................................ 210/167, 143,
210/194, 196, 195.1, 206, 209, 252, 253,
254, 258, 259, 323.2, 332, 333.01, 411,
416.1, 418, 138, 139, 140; 138/40

[56] References Cited

U.S. PATENT DOCUMENTS

| | | | |
|---|---|---|---|
| 3,502,215 | 3/1970 | Cahan ...................................... | 210/167 |
| 3,550,778 | 12/1970 | Kesselman ............................... | 210/167 |
| 3,616,917 | 11/1971 | Hellwege ................................. | 210/167 |
| 3,774,625 | 11/1973 | Wiltrout ................................... | 210/167 |
| 3,810,544 | 5/1974 | Armstrong et al. ...................... | 210/167 |
| 3,850,805 | 11/1974 | Armstrong ............................... | 210/167 |
| 4,104,164 | 8/1978 | Chelton ................................... | 210/167 |
| 4,168,231 | 9/1979 | Allen et al. .............................. | 210/167 |
| 4,168,232 | 9/1979 | Allen et al. .............................. | 210/167 |
| 5,093,012 | 3/1992 | Bundy et al. . | |
| 5,324,425 | 6/1994 | Ellison .................................... | 210/167 |
| 5,374,352 | 12/1994 | Pattee ...................................... | 210/167 |
| 5,395,537 | 3/1995 | Ellison .................................... | 210/167 |

FOREIGN PATENT DOCUMENTS 2143331  2/1973  France .

OTHER PUBLICATIONS

Netherlands Search Report.

*Primary Examiner*—Robert J. Popovics
*Attorney, Agent, or Firm*—Dority & Manning

[57] ABSTRACT

The invention relates to a method for the purification of a polluted liquid, especially a washing liquid used at a washing installation, by sucking the polluted liquid and leading it through at least one filter and next leading back the liquid purified thus to a take-off point, whereby the liquid flow carried through the filter is maintained at a substantially constant level. The invention further relates to an apparatus for carrying out the method comprising a suction line connected to a source of polluted liquid, a discharge line for the purified liquid debouching at a take-off point, at least one filter unit positioned between the suction line and the discharge line, a pump connected therewith in series and a device for limiting the amount of liquid flowing across the filter unit positioned in series with the filter unit. The described method and apparatus allow large savings on the amount of washing liquid required for operating a washing installation and lead to considerably decreased environmental damage.

4 Claims, 4 Drawing Sheets

FILTRATION SYSTEM FOR RECYCLING WATER USED IN A CAR WASH

BACKGROUND OF THE INVENTION

The present invention relates to a method for the purification of a polluted liquid, especially a washing liquid used at a washing installation.

Up to now it is common practice that in washing installations, such as car washes, the used washing liquid is collected in a collecting reservoir, and next, after the removal of oil and/or grease, is discharged at a sewer, whereas the washing installation is operated with clean water supplied by the public mains system. It is a disadvantage of this known method that the operating costs of the washing installation are high, because of the large need for fresh water. Further the environment is heavily polluted, while the costs originating therefrom are increasingly charged to the polluter, i.e. the owner or user of the washing installation. Further, water of the mains system is "unnecessarily" pure and thus relatively expensive for non-consumptive applications.

OBJECTS AND SUMMARY OF THE INVENTION

It is a principal object of the invention to eliminate the disadvantages of conventional washing systems. This goal is achieved by sucking the polluted liquid and leading it through at least one filter and next leading the liquid thus purified back to a take-off point. Consequently, the liquid can be used again such that the operative costs of the washing installation and the environmental damage originating therefrom can be diminished, without negatively influencing the operation of the washing installation.

Additional objects and advantages of the invention will be set forth in part in the following description, or may be obvious from the description, or may be learned through practice of the invention.

The invention also relates to an apparatus for carrying out the above-mentioned method. According to the invention, such an apparatus comprises a suction line connected to a source of polluted liquid, a discharge line for the purified liquid debouching at a take-off point, at least one filter unit positioned between the suction line and discharge line and a pump connected therewith in series.

A proper purifying operation is obtained, when the filter unit comprises a number of parallel cylindrical filter elements extending into the direction of flow, the cylinder wall of the filters being permeable to liquid but not permeable to pollution particles present in the liquid. In this aspect, preferably the cross-section of each cylindrical filter element is substantially smaller than the cross-section of the suction and discharge lines. Applying such a filter unit, also indicated as micro filter, a very good purification is obtained at a relatively low pumping power.

Preferably the apparatus according to the invention comprises means for limiting the amount of liquid flowing across the filter unit, said means being positioned in series with the filter unit. With such limiting means, one can assure that per unit of time always just such an amount of liquid is supplied to the filter that the operation of the filter is optimized. A constructively simple embodiment of the apparatus is obtained when the flow limiting means comprise at least one flow limiting element narrowing into the direction of flow and having a flexible wall.

Further characteristics and advantages of the invention are elucidated referring to an example under reference to the enclosed drawing.

DETAILED DESCRIPTION OF THE PREFERRED EMBODIMENT

Reference will now be made in detail to the presently preferred embodiments of the invention, one or more examples of which are illustrated in the figures. Each example is provided by way of explanation of the invention, and not as a limitation thereof. In fact, various modifications and variations can be made in the invention without departing from the scope and spirit of the invention.

Figure 1:
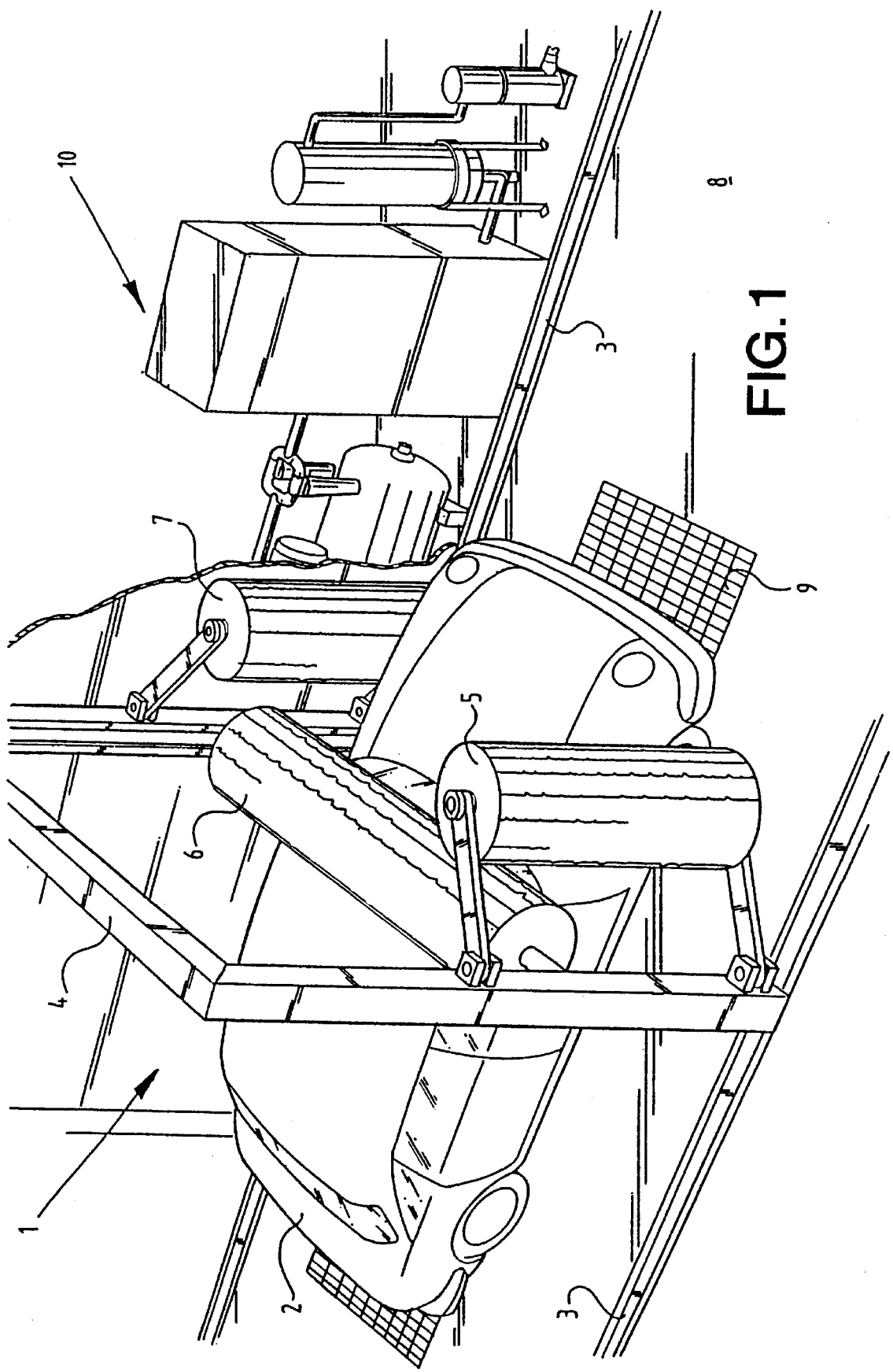
FIG. 1 is a partially broken-away perspective view of an automatic car wash comprising a purification apparatus according to the invention.

An automatic car wash (FIG. 1) for cars 2 comprises a bridge 4 movable along two rails 3 and carrying three rotating brushes 5, 6, 7. The washing installation comprises means (not shown) for spraying washing and/or rinsing liquids on a car 2 to be washed. For collecting the used washing and/or rinsing liquid, a collecting reservoir covered by a grid 9 is positioned at the floor 8 of the automatic car wash 1. The washing and/or rinsing liquids collected in this reservoir are purified by a purification apparatus 10 and made suitable to be used again.

Figure 2:
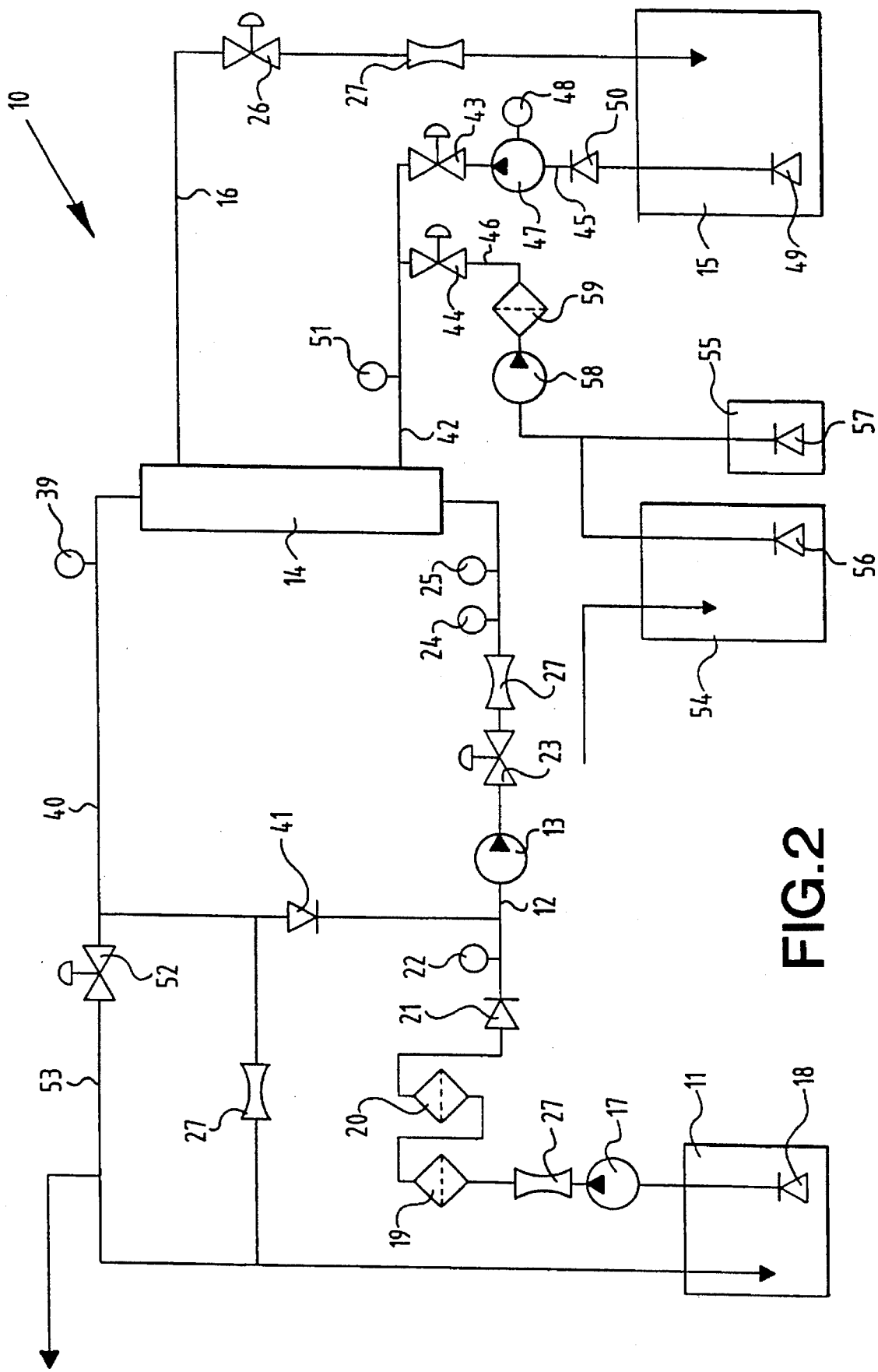
FIG. 2 shows a basic diagram of the purification apparatus according to the invention.

The purification apparatus 10 (FIG. 2) comprises a suction line 12 connected to the collecting reservoir 11 for the used polluted washing and/or rinsing liquid. A main pump 13 is provided in the suction line 12. A filter unit 14 is connected in series with the main pump 13 and a discharge line 16 extending from the filter unit 14 to a collecting reservoir 15 for purified liquid. In the suction line 12, an auxiliary pump 17 is provided, lifting the polluting liquid through a one-way valve 18 towards a first pre-filter 19, for example a dust filter having a mesh of 100 microns, and a second pre-filter 20, for example a dust filter having a mesh of 10 microns. The liquid pre-filtered in this way is carried across a one-way valve 21 along a pressure relief 22, which protects the membrane of the main pump 13 from a possibly too high pressure. Following the main pump 13 there is provided an electro-magnetic butterfly valve 23 which during normal operation of the purification apparatus 10 assumes a fixed position, but which during starting-up of the apparatus is controlled in such a way that a flow of liquid is supplied to the filter unit 14 being as constant as possible. Between the valve 23 and the filter unit 14 a second pressure regulator 24 is provided protecting the filter unit 14, as well as a pressure indicating means 25. In the discharge line 16 there also is provided a controllable electromagnetic butterfly valve 26 which is in an open position during normal operation of the purification apparatus 10.

Figure 4:
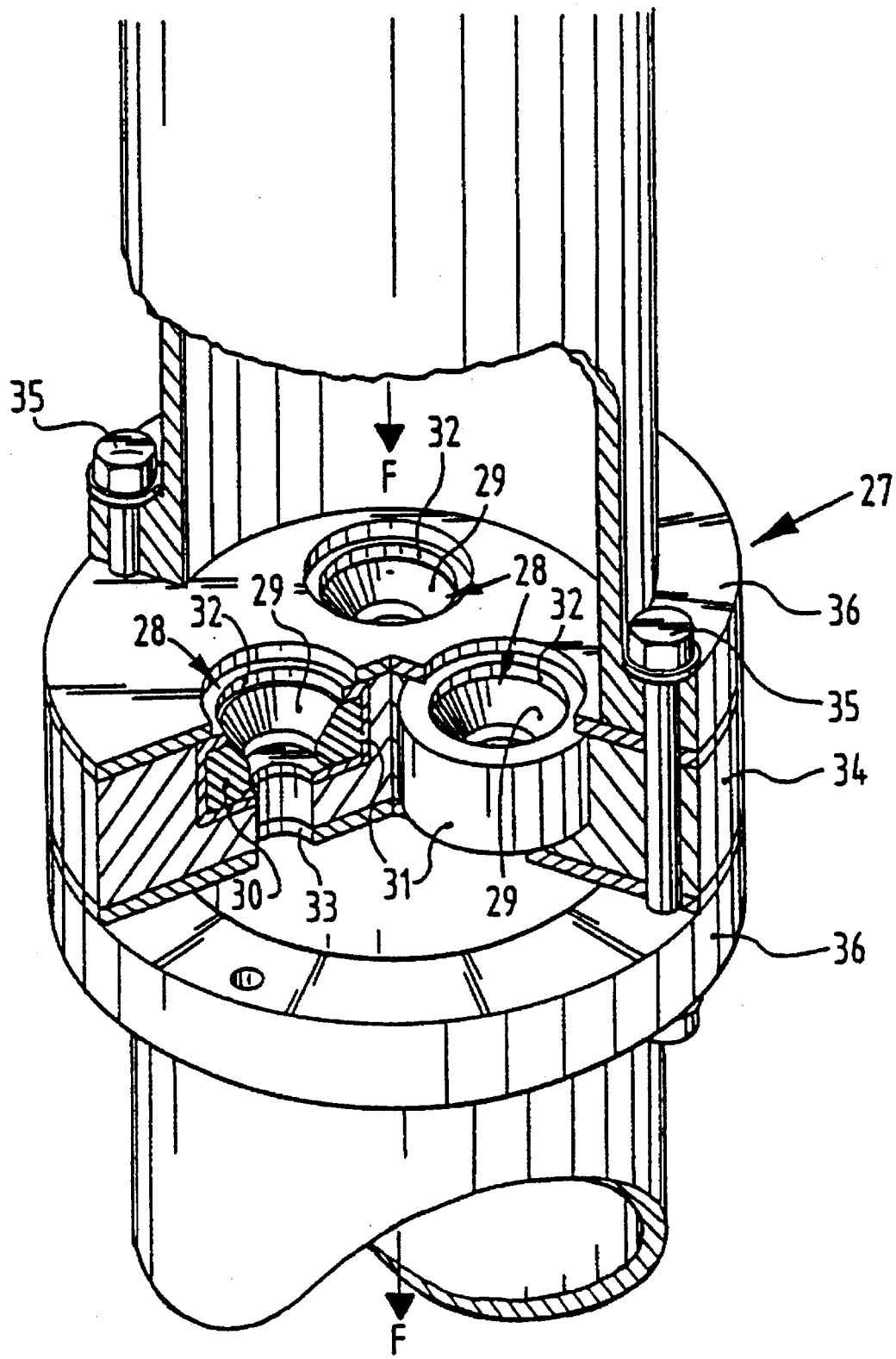
FIG. 4 is a partly cut-away perspective view of flow limiting means provided in the purification apparatus.

In the suction line 12, as well as in the discharge line 16, means are provided for limiting the amount of liquid flowing across the filter unit 14 per unit of time. These flow limiting means 27 each comprise three parallel flow limiting elements 28 (FIG. 4), of which the cross section diminishes in the direction of flow (indicated by arrows F in the figure), and of which the inner wall 29 is flexible. In this context, the inner wall 29 may be constituted by a ring 30 of rubber or another flexible (plastics) material narrowing into the direction of flow, which is housed in an annular housing 31 comprising a relatively wide inlet opening 32 at its upper surface and a considerably smaller outlet opening 33 at its lower surface. In turn, these three flow limiting elements 28 as an assembly may be housed in a liquid-tight sandwich construction 34 with corresponding openings at the upper and lower surfaces. The liquid-tight sandwich plate 34 comprising therein the flow limiting elements 28 in a fluid-tight manner is clamped in between two end flanges 36 of parts of the suction or discharge line 12 and 16, respectively, by means of a number of clamping bolts 35. The flow limiting means 27 take care that the filter unit 14 obtains a constant flow of liquid to be purified per unit of time. Through an appropriate choice of the ratio between the total cross section of the openings 33 and the dimensions of the micro filter unit 14 one can guarantee that the filter unit 14 always will be in an optimum operational condition at which a compromise as good as possible is obtained between the filter operation and the processing capacity of the filter unit 14 on one hand, and the power delivered by the pump 13 on the other hand.

Figure 3:
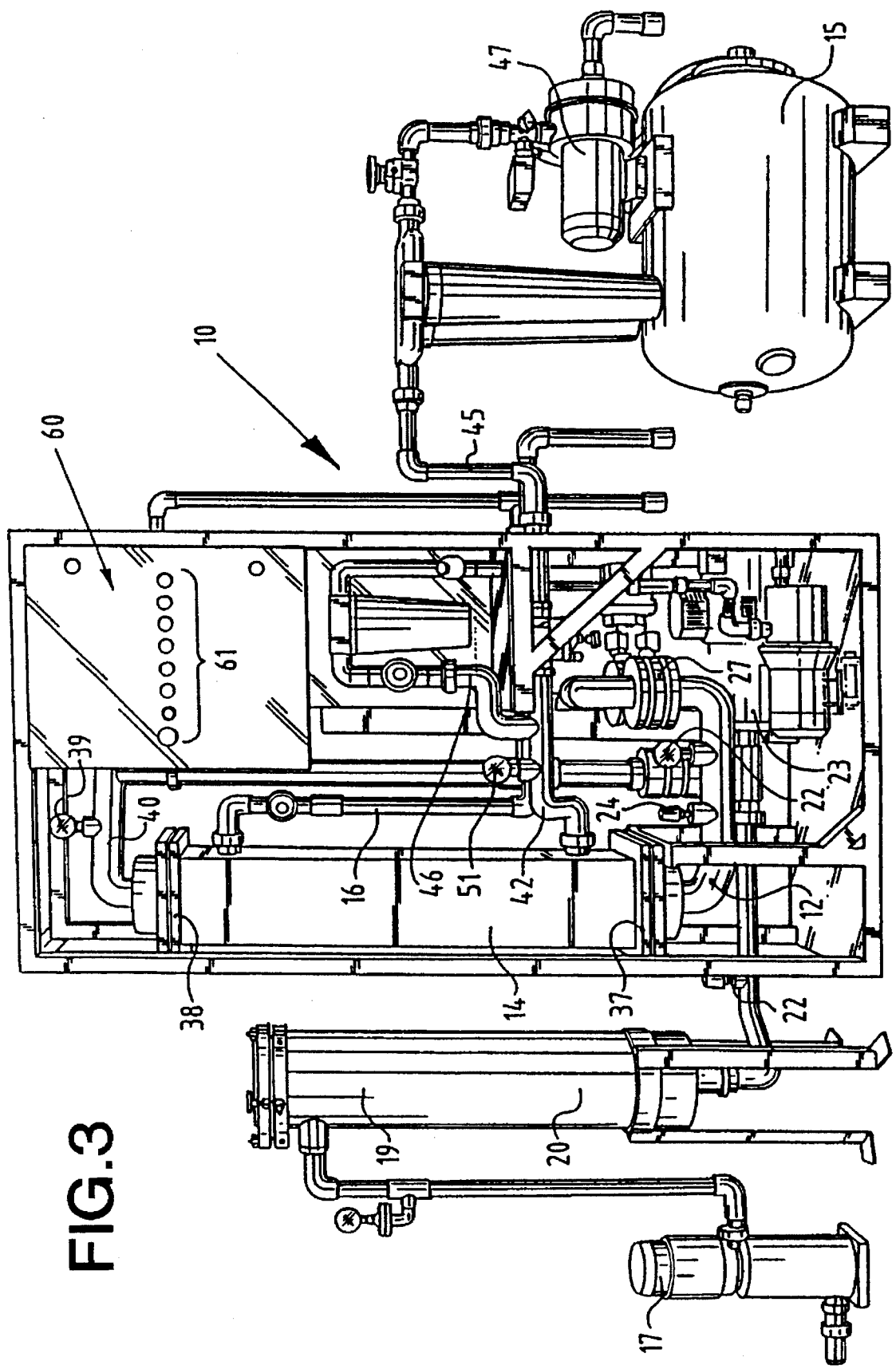
FIG. 3 is a perspective view of the purification apparatus illustrated in FIG. 2.

The filter unit 14 comprises a large amount of parallel filter elements extending in the direction of flow, the cylindrical wall of each of which is permeable to liquid but not permeable to small particulated pollutants. The cross section of each cylindrical filter element is considerably smaller than the cross section of the suction line 12 and the discharge line 16. The cylindrical filter elements debouch at both sides of the filter unit 14 into connection flanges 37, 38 (FIG. 3), which in a fluid-tight manner seal the inner space of the filter unit 14 around the cylindrical filter elements. That part of the liquid to be purified which does not part across the cylindrical walls of the filter elements and is carried through the inner space of the filter unit towards the discharge line 16 leaves the filter unit 14 and is returned to the suction line 12 through a return line 40 comprising a pressure indication device 39 and through a one-way valve 41 and next is returned to the filter unit 14 through the main pump 13.

To the lower side of the housing of the filter unit 14 there is connected a collection-supply line 42 for rinsing liquid. By opening one of two electromagnetic valves 43, 44 closed during normal operation of the purification apparatus 10, this collecting-supply line can be connected to a supply line 45 for purified liquid, or a supply line 46 for a chemical soaking substance, respectively. Through the supply line 45, using a pump 47 connected to a pressure relief 48, purified liquid is supplied from the reservoir 15 along two one-way valves 49, 50. This purified liquid, constantly pressurized, at for example 2 to 4 bar, as indicated by the pressure indication device 51, is periodically, for example once each three minutes, sprayed into the filter unit 14. To achieve this, firstly the normal operative flow across the suction line 12 and discharge line 16 is stopped by closing the valves 23 and 26, whereas at the same time a valve 52 in a discharge line 53 for polluted liquid is opened. Thus, the purified liquid from the reservoir 15, which acts as rinsing liquid, is sprayed into the housing of the filter unit 14 at the lower side thereof, and enters from the outside through the cylindrical walls of the cylindrical filter elements, whereafter it leaves the filter unit 14 at its upper side through the return line 40 and polluted liquid-discharge line 53. Optionally the polluted liquid for example may be carried to a depositing reservoir or may be returned to the reservoir 11 to be purified again. Rinsing the filter unit 14 in this way may take about 5 to 10 seconds.

The supply line 46 for the chemical soaking substance is connected to a reservoir 54 collecting fresh water from the mains system and to a reservoir 55 containing chemicals. The chemicals and mains water are, with a certain proportion of mixture, for example 1 to 10, lifted by a pump 58 along one-way valves 56, 57, and finally the chemical soaking substance is carried to the filter unit 14 across a filter 59, for example a dust filter having a mesh of 50 microns. Now again the valves 23 and 26 are closed, such that the chemical soaking substance having dissolved therein pollutions from the filter unit 14 finally leaves the purification apparatus 10 via the discharge line 53. This soaking process using a chemical soaking substance for example occurs once each day, according to which the filter unit is filled up with the soaking substance and next a pump 48 is stopped and the closing device 44 is closed, whereafter the soaking substance remains for example for about one hour in the filter unit 14 before being pumped away through a discharge line 53.

The purification apparatus 10 is controlled by a control unit 60 (FIG. 3) comprising a number of so-called PLC's (Programmable Logic Controls). Using these for example rinsing cycles may be programmed in a simple way, whereafter opening and closing several controllable valves and starting-up and stopping several pumps further occurs automatically after pressing one or more pre-set buttons 61. Apart therefrom a complete manual operation can be possible, for example based upon the pressures in the different lines, which are indicated at the respective pressure indication devices.

If desired, ahead of the collection reservoir 11 for polluted liquid a separating apparatus for oil and grease may be positioned, thus preventing an excessive pollution of the filters.

Although previously the purification apparatus 10 has been described in combination with a washing installation for cars, it will be appreciated that the purification apparatus is also fit for application in other situations in which polluted liquids have to be purified and processed to be reused.

It will be apparent to those skilled in the art that various modifications and variations can be made in the present invention without departing from the scope or spirit of the invention. For example, features illustrated or described as part of one embodiment can be used on another embodiment to yield a still further embodiment. It is intended that the present application cover such variations and modifications as come within the scope of the appended claims and their equivalents.

I claim:

1. An automatic automobile washing installation water filtering system, said system comprising:

a polluted water reservoir for collecting used water from said washing installation;

a filter disposed downstream in a direction of flow of said used water from said reservoir;

a pumping device configured to pump said used water from said reservoir through said filter;

at least one flow limiting device disposed in series between said pumping device and said filter, said flow limiting device providing a flow of said used water through said filter, said flow limiting device comprising a plurality of parallel flow limiting channels each of which narrows in the direction of said used water flow, said narrowing channels defined at least in part by elastic elements housed in annular housings having an inlet opening at an upstream surface and a relatively smaller outlet opening at a downstream surface, said annular housings being disposed in a plate sandwiched between two end flanges having openings which correspond to said inlet and outlet openings;

a discharge path defined from said filter to a collection reservoir of said system for recycling purified water from said filter to said collection reservoir;

a rinsing liquid supply line in fluid communication with said filter and configured to draw a rinsing liquid from a rinsing liquid source and to direct said rinsing liquid through said filter in a direction opposite to that of said used water through said filter;

means for periodically and automatically isolating said filter from said used water flow and connecting said filter to said rinsing liquid supply line to periodically rinse said filter;

a chemical cleaning solution supply line in fluid communication with said filter and configured to draw a chemical cleaning solution from a cleaning solution source and to direct said solution into said filter; and means for periodically and automatically isolating said filter from said used water flow and connecting said filter to said chemical cleaning solution supply line for soaking said filter for a time period in said solution adequate for cleaning said filter.

2. The automobile washing installation system of claim 1, wherein said rinsing liquid connecting means and said chemical cleaning solution connecting means comprise a computer control system and a plurality of remotely controlled valves controlled by said computer control system, said computer control system configured to rinse and clean said filter at predetermined time intervals.

3. The automobile washing installation system of claim 1, wherein said filter comprises a plurality of parallel cylindrical filtering elements longitudinally disposed in the direction of flow through said filter, each said filtering element having a cylinder wall which is permeable to liquid but impermeable to unwanted particulate particles carried by said used water.

4. The automobile washing installation system of claim 1, further comprising a second flow limiting device disposed downstream.

* * * * *